United States Patent [19]

Lee et al.

[11] Patent Number: 4,933,198
[45] Date of Patent: Jun. 12, 1990

[54] PRODUCTION OF LOW-ETHANOL BEVERAGE BY MEMBRANE EXTRACTION

[76] Inventors: Eric K. L. Lee, 8 Till Dr., Acton, Mass. 01720; Vinay J. Kalyani, 70 Boston Rd. #H226, Chelmsford, Mass. 01824; Stephen L. Matson, 15 Withington La., Harvard, Mass. 01451

[21] Appl. No.: 296,255

[22] Filed: Jan. 12, 1989

Related U.S. Application Data

[60] Continuation-in-part of Ser. No. 897,489, Aug. 18, 1986, Pat. No. 4,816,407, which is a division of Ser. No. 786,787, Oct. 11, 1985, Pat. No. 4,778,688.

[51] Int. Cl.$^5$ .............................................. C12G 3/00
[52] U.S. Cl. .................... 426/319; 210/634; 210/640; 210/651; 426/387; 426/475; 426/487; 426/493; 426/592
[58] Field of Search ............ 426/14, 330.4, 11, 533, 426/312, 319, 474, 475, 476, 486, 492, 493, 494, 386, 387, 592; 210/640, 651, 634, 645, 643, 648, 644, 321.89; 55/16, 158

[56] References Cited

U.S. PATENT DOCUMENTS

| | | | |
|---|---|---|---|
| 2,611,490 | 9/1953 | Robinson | 210/150 |
| 3,186,917 | 6/1965 | Gerhardt et al. | |
| 3,201,328 | 8/1965 | Williams | 195/141 |
| 3,275,528 | 9/1966 | Ainis | 195/104 |
| 3,291,613 | 12/1966 | Raible | |
| 3,335,545 | 8/1967 | Robb et al. | 55/16 |
| 3,502,651 | 3/1970 | Oldenburg | |
| 3,552,574 | 1/1971 | Lowe et al. | |
| 3,634,128 | 1/1972 | Bolin | 210/640 |
| 3,713,838 | 1/1973 | Ziegler | |
| 3,865,960 | 2/1975 | Wucherpfenning et al. | |
| 3,865,961 | 2/1975 | Wucherpfenning et al. | |
| 3,915,820 | 10/1975 | Kominek | |
| 3,947,163 | 11/1974 | Molyneux | 131/143 |
| 3,956,112 | 5/1979 | Lee et al. | 210/22 |
| 3,957,504 | 5/1976 | Ho et al. | 75/101 |
| 4,015,020 | 3/1977 | Nagasawa et al. | |
| 4,083,904 | 4/1978 | Sano et al. | |
| 4,218,312 | 8/1980 | Perry | |
| 4,311,594 | 1/1982 | Perry | 210/500.38 |

(List continued on next page.)

FOREIGN PATENT DOCUMENTS

| | | |
|---|---|---|
| 28769 | 5/1981 | European Pat. Off. |
| 213771 | 11/1983 | Japan . |
| 1585376 | 1/1970 | France . |
| 76-26399 | 8/1976 | Japan . |
| 78-24568 | 9/1979 | Japan . |
| 60-106504 | 6/1985 | Japan . |
| 1079517 | 8/1967 | United Kingdom . |
| 1177126 | 1/1970 | United Kingdom . |
| 1447505 | 8/1976 | United Kingdom . |

OTHER PUBLICATIONS

Schiebel–Industrial and Engineering Chemistry, 42:1497 (1950)

(List continued on next page.)

Primary Examiner—Donald E. Czaja
Assistant Examiner—Carolyn Paden

[57] ABSTRACT

Low-ethanol wines, beer, distilled spirits, and other alcoholic beverages are produced by treating ordinary alcoholic beverages with novel membrane extraction methods. Semipermeable membranes and gas-phase extraction fluids are employed to selectively extract ethanol into the gas-phase, while leaving substantially intact the complement of other organic constituents that contribute to the color, aroma, and taste of the beverage. Methods are provided for balancing the water activity of the gas-phase extraction fluid about equal to that in the beverage, so as to inhibit water transport across the membrane independent of the ethanol/water selectivity of the membrane.

33 Claims, 11 Drawing Sheets

U.S. PATENT DOCUMENTS

| | | |
|---|---|---|
| 4,401,678 | 8/1983 | Beaumont . |
| 4,405,652 | 9/1983 | Boucher .............................. 426/494 |
| 4,443,414 | 4/1984 | Kim ...................................... 423/54 |
| 4,499,117 | 2/1985 | Bonneau ............................. 426/592 |
| 4,532,140 | 7/1985 | Bonnome ............................ 426/13 |
| 4,539,117 | 9/1985 | Meyer et al. ........................ 210/639 |
| 4,581,236 | 4/1986 | Bandel et al. ....................... 426/14 |
| 4,591,440 | 5/1986 | Higashimura ..................... 210/640 |
| 4,610,791 | 9/1986 | Henne et al. . |
| 4,610,887 | 9/1986 | Galzy et al. . |
| 4,612,196 | 9/1986 | Goldstein et al. . |
| 4,617,127 | 10/1986 | Light ................................... 210/651 |
| 4,617,127 | 10/1986 | Light . |
| 4,650,574 | 3/1987 | Hilgendorff ....................... 210/640 |
| 4,655,927 | 4/1987 | Ford .................................... 210/639 |
| 4,755,299 | 7/1988 | Bruschke ............................ 55/16 |
| 4,778,688 | 10/1988 | Matson ............................... 426/492 |

OTHER PUBLICATIONS

Hartline–Science, 260:41 (1979)
Bui et al.–Am. J. Enol. Vitic. 37:297 (1986)
Light et al.–AIChE Symp. Ser., 82:1
Hoyrup–"Beer" in Kirk-Othmer Encyc. of Chemical Technology Vol. 3, pp. 692–735 (3rd Ed. 1978)
Mulder et al.–J. Membrane Sci. 16:269 (1983)
Neel and Aptel–Entropie No. 104:15 (1982)
Neel et al.–Entropie No. 104:27 (1982)
Benly–"The Treatment of Waste Emulsified Oils by Ultrafiltration", Filt. and Sep. Jan./Feb. 1977, pp. 53–55.
Sanders–1960 Latest Advances in Membrane Permeation Petroleum Refiner 39(6) 133
Jameson, T. A.: Meltzer, T. H.–"A Review of Cellulosic Membrane Applications to Air, Water and Biological Fluids Filtration," *Appl. Polym. Symp.* 1970, 13, 267–283.
"Hollow-Fiber Membranes," Kirk-Othmer, *Encyclopedia of Chemical Technology*, Third Edition, Vol. 12, pp. 492–513 (1984).
"Reverse Osmosi," Kirk-Othmer, *Encyclopedia of Chemical Technology*, Third Edition, Vol. 20, pp. 230–242 (1984).
"In Search of the Perfect Membrane," *High Technology* 1983, November, 72.

Staude, E.–"Polymere fur die Separation mit Membranen," *Die Angewandte Makromolekulare Chemie* 1982, 109/110, 139–164.
Pusch, W.; Walch, A.–"Synthetic Membranes—Preparation, Structure, and Application," *Angew. Chem. Int. Ed. Engl.* 1982, 21, 660–685.
Kesting, R. E.–*Synthetic Polymeric Membranes* Puropore Incorporated, Tustin California, pp. 4–5, 296–299 (1981).
Huang, R. Y. M.; Jarvis, N. R.–"Separation of Liquid Mixtures by Using Polymer Membranes, II. Permeation of Aqueous Alcohol Solutions Through Cellophane and Poly(Vinyl Alcohol)," *J. Appl. Polm. Sci.* 1970, II, 2341–2356.
Tealdo, G. C.; Canepa, P.; Munari, S.–"Water-Ethanol Permeation Through Grafted PTFE Membranes," *J. Memb. Sci.* 1981, 9, 191–196.
Wilke, C. R.; Maiorella, B.–"High Productivity Anaerobic Fermentation with Dense Cell Culture," *Adv. Biotechnol., (Proc. Int. Ferment. Symp.)* 1981, 1, 539–545.
Kyung, K. H.; Gerhardt, P.–"Continuous Production in Ethanol by Yeast 'Immobilized' in a Membrane-Contained Fermentor,'" *Biotechnol. Bioeng.* 1984, 26, 252–256.
Gregor, H. P.; Jefferies, T. W.–"Ethanolic Fuels from Renewable Resources in the Solar Age," *Ann. N. Y. Acad. Sci.* 1979, 326, 273–287.
Meltzer, T. H.; Gutfreund, K.; Kulshrestha, V. K.; Stake, A. M.–"Optimized Cellulose Membranes for Artificial Kidney Dialysis Applications," *Trans. Amer. Soc. Artif. Int. Organs.* 1968, 14, 12–18.
Klein, E.; Holland, F.; Lebeouf, A.; Donnaud, A.; Smith, J. K.–"Transport and Mechanical Properties of Hemodialysis Hollow Fibers," *J. Memb. Sci.* 1976, 1, 371–396.
"Dextrose and Starch Syrups," Kirk-Othmer, *Encyclopedia of Chemical Technology*, Third Edition, Vol. 7, pp. 564–577 (1984).
Symbas, P. N.; Tyras, D. H.; Baldwin, B. J.–"Left Ventricular Function During Acute Ethanol Intoxication and Hemodialysis," *J. Surgical Res.* 1973, 15, 207–211.

(List continued on next page.)

OTHER PUBLICATIONS

Gardner, C. R.–"Biomedical Applications of Membrane Processes," in *Membrane Separation Processes* Meares, P., Ed., Elsevier Scientific Publishing Company, Amsterdam, pp. 540–542 (1976).

Colton, C. K.; Lowrie, E. G.–"Hemodialysis: Physical Principles and Technical Considerations," in The Kidney 2nd Edition, Brenner, B. M.; Rector, Jr., F. C., Eds., Vol. II, pp. 2425–2474 (1981).

Margaritis, A.; Wilke, C. R.–"The Rotorfermentor. I. Description of the Apparatus, Power Requirements, and Mass Transfer Characteristics," *Biotechnol. Bioeng.* 1978, 20, 709–726.

Margaritis, A.; Wilke, C. R.–"The Rotorfermentor. II. Application to Ethanol Fermentation," *Biotechnol. Bioeng.* 1978, 20, 727–753.

Michaels, A. S.–"New Separation Technique for the CPI," *Chem. Engin. Prog.* 1968, 64, 31–43.

Lonsdale, H. K.–"The Growth of Membrane Technology," *J. Memb. Sci.* 1982, 10, 81–181.

Messing, R. A.–"The Potential Applications of Molecular Inclusion to Beer Processing," *The Brewers Digest* 1971, December, 60–63.

Harrison, P. S.–"Reverse Osmosis and Its Applications to the Food Industry," *Food Trade Review*, 1970, November, 33–37.

Porter, M. C.; Michaels, A. S.–"Membrane Ultrafiltration," *Chem. Tech.* 1971, January, 56–63.

Pierrard, P.–"Recents Progres en Electrodialyse," *Industries Aliment. Agric.* 1976, 569–581.

Shpritsman, E. M.; Gavrilyuk, V. S.–"Controlling Wine Acidity by Electrodialysis," *Sadovod. Vinograd. Vinodel. Mold.* 1975, 30(4), 25–28.

Ng, P. K.; Mitra, G.; Lundblad, J. L.–"Simultaneous Salt and Ethanol Removal from Human Serum Albumin," *J. Pharmaceut. Sci.* 1978, 67(3), 431–433.

Jaeger, P.; Puespoek, J.–"Low-Alcohol Beers and Low-Alcohol Beverages with Beer Character," *Mitt. Versuchsstn. Gaerungsgewerbe Wien* 1978, 32(3-3), 36–40.

Niefind, H. J.–"Practical Experiences with Dialysis for the Production of Low Alcohol Beer," *Monatsschrift fur Brauerei* 1982, 35(3), 95–97.

Niefind. H. J.; Schmitz, F. J.–"New Process for Reducing Alcohol Content of Beer by Selective Diffusion Through Membranes," *Proceedings, European Brewery Convention* 1981, 599–606.

Wucherpfennig, K.; Neubert, S.–"Zur Teilweisen Entalkoholisierung von Bier Mittels Umkehrosmose," *Brauwelt Jg.* 1976, 116(47), 1573–1579, Postel, W.; Prasch, E.–"Untersuchungen zur Weinsteinstabilisierung von Wein durch Elektrodialyse," *Die Weinwirtschaft* 1978, 1/2, 28–32.

Paronetto, L.; Paronetto, L.; Braido, A.–"Alcune Prove di Stabilizzazione Tartarica di Mosti e Eini Mediante l'Elettrodialisi," *Vignevini* 1977, 4(11), 9–15.

Wucherpfennig, K.; Millies, K. D.–" Uber den Einfluss der Elektrodialysebehandlung zum Zwecke der Weinsteinstabilisierung auf die Konzentration der Aminosauren im Wein," *Mitteilungen: Rebe, Wein, Obstbau und Fruechteverwertung* 1976, 26(1), 13–26.

Wucherpfennig, K.–"Possibilities d'Application de Procedes Utilisant des Membranes pour la Stabilisation des Vins (Ultrafiltration, Osmose Inverse, Electrodialyse)," *Ann. Technol. Agric.* 1978, 27(1), 319–331.

Wucherpfennig, K.–"Possibilities d'Utilisation de Processus Membranaires dans l'Industrie des Boissons (Osmose Inverse, Ultrafiltration, Electrodialyse)," *Bulletin de l'O. I. V.* 1980, 589, 187–208.

Mercz, A.–"Applications of Membrane Processes in Winemaking," *Borgazdasag* 1976, 24(2), 55–60.

Toth, M.–"Use of Autoanalyzer for Analytical Measurements in the Beer Industry, IV.," *Soripar* 1979, 26, 18–24.

Coulman, G. A.; Stieber, R. W.; Gerhardt, P.–"Dialysis Continuous Process for Ammonium-Lactate Fermentation of Whey: Mathematical Model and Computer Simulation," *Appl. Environ. Microbiol.* 1977, 34(6), 725–732.

PRODUCTION OF LOW-ETHANOL BEVERAGE BY MEMBRANE EXTRACTION

The present application is a continuation-in-part of copending Ser. No. 897,489, filed Aug. 18, 1986, now U.S. Pat. No. 4,816,407, which is a divisional continuation of Ser. No. 786,787, filed Oct. 11, 1985, now U.S. Pat. No. 4,778,688, incorporated by reference herein in its entirety.

FIELD OF THE INVENTION

This invention relates to novel methods for the production of wine and other ethanol-containing mixtures that are low in ethanol content. More particularly, membrane extraction systems are described which selectively remove ethanol from wine and other beverages while retaining the water and numerous other organic constituents that contribute to the color, bouquet and flavor of the beverages.

Additionally, the invention has applicability to the removal of other organic solutes from aqueous mixtures in cases where it is necessary or desirable to minimize the quantity of water that is simultaneously removed.

BACKGROUND

Alcoholic beverages are an important class of consumer goods. Recently, a trend toward beverages of lower alcohol content has developed due, in part, to the public's increasing health-consciousness and the social and legislative initiatives against drunk driving. Changes in demographics and consumer preferences have also led to contraction in certain segments of the liquor and spirits business.

In response, makers of alcoholic beverages have introduced low-alcohol beers and wines to the market. These products are made either by altering the fermentation process to generate less ethanol, or by processing conventionally made beverages to remove part of their alcohol content. However, such low-alcohol beverages have proven to be lower in quality than their counterparts with normal alcohol content. Stopping fermentation prematurely usually changes the relative concentrations of the reaction products essential to the character of the beverage. Alternatively, removing alcohol from a normal beverage with conventional processes usually results in significant losses of flavor components from the beverage. The need continues to exist, therefore, for improved technologies that are capable of efficient alcohol reduction while preserving the character of the original beverages.

SOLVENT EXTRACTION METHODS

Conventional solvent extraction technology has long been applied to the recovery of ethanol from aqueous solutions in industry (Schiebel, 1950, Industrial & Engineering Chemistry 42: 1497-1508). This technology, however, is not directly applicable to the production of low-alcohol wines or other beverages. There would invariably be excessive solubility of the extraction solvent in the wine and, hence, contamination. Emulsification and physical entrainment might also occur (Hartline, 1979, Science 206: 41-42). Furthermore, with most extraction solvents it would be that numerous other organic constituents of the wine would be coextracted with the ethanol, thereby creating a wholly unacceptable product.

Membrane solvent extraction, in which a membrane is interposed between a solvent containing a solute to be extracted and a second, immiscible extraction solvent, prevents the solvent entrainment and emulsion formation problems inherent to conventional solvent extraction technology. For example, Kim, in the U.S. Pat. No. 4,443,414, used a microporous membrane to extract molybdenum from solutions containing molybdenum and other mineral ions. Lee et al., in U.S. Pat. No. 3,956,112, described a membrane solvent extraction system for general application based upon the use of a non-porous membrane. The membrane was solvent-swollen, so that one of two substantially immiscible liquids which the membrane separated caused the membrane to swell, forming an intermediary zone through which diffusion of solute material could occur. Ho et al., in U.S. Pat. No. 3,957,504, used an ion-exchange membrane in the manner of Lee et al., to recover metal ions from an aqueous solution.

Because the above membrane solvent extraction systems involve the use of solvent-swollen membranes, they do not prevent the molecular diffusion of dissolved solvent into the aqueous phase. Furthermore, the membranes of the prior art systems show no permselectivity for the solutes to be removed. Instead, any selectivity observed is due to the choice of the extraction solvent or to the inclusion of chelating agents in the solvent that are selective for the metal ions that are to be extracted. Finally, the organic extraction solvents employed by Ho et al., and by Lee et al., would be quite unsuitable for the production of beverages such as low-alcohol wines, distilled spirits, and beers for the reason that even minor amounts of these solvents, when dissolved in the aqueous phase, would represent sometimes toxic and invariably unacceptable contaminants or adulterants in the beverage.

PRESSURE-DRIVEN METHODS

Pressure-driven membrane processes operating at ambient or sub-ambient temperatures may remove excessive quantities of water and concentrate the alcoholic beverage in the process. In reverse osmosis, for example, alcohol removal is achieved by simultaneous removal of ethanol and water by pressurizing the beverage against a membrane with limited ethanol/water selectivity (Bui et al., 1986, Am. J. Enol. Vitic, 37: 297 and Light et al., 1985, AIChE Symp. Ser. 250, No. 82, Recent Advances in Separation Techniques and Light, U.S. Pat. No. 4,617,127, issued October, 1986). To compensate for the water loss, the beverage may be diluted with water prior to alcohol reduction, or water could be added to the concentrated product after processing to replace the volume originally occupied by ethanol and water. Either approach would involve exchanging part or most of the native water contained in the beverage. Loss of volatile flavor components is frequently observed when water is removed from the beverage. This phenomenon may be explained on the basis of "flow-coupling," where the passage of one permeant is coupled with the direction and rate of diffusion of another permeant. Alcohol reduction processes requiring water exchange or alternative means of reconstitution can thus be expected to alter the flavor/aroma profiles and incorporate anomalous organoleptic qualities to the beverage. Another consideration is that the water used for predilution or reconstitution must be thoroughly purified so that foreign materials or impurities are not introduced into the beverage. The resource needs associated with generating a high quality water supply can be substantial.

EVAPORATION AND CONVENTIONAL PERVAPORATION METHODS

Excess alcohol may also be removed from a beverage by evaporation. For example, light beer may be produced by boiling regular beer for a number of hours to drive off much of the alcohol. Hoynup, "Beer", in Kirk-Othmer *Encyclopedia of Chemical Technology*, Vol. 3, pp. 692-735 (3rd Ed. 1978). Such protracted heating of wine would degrade many of the constituents that contribute to its flavor, color and bouquet. With beer, flavor that is lost by boiling may be restored to some degree by the addition of aroma substances recovered from yeast (German Pat. No. 1,767,040), but there is no such simple remedy for the restoration of flavor to thermally damaged wine.

The boiling of beer to remove alcohol also causes a substantial loss of water. That poses no problem for beer because it can simply be reconstituted by the addition of replacement water. Dilution of wine with make-up water, however, is restricted or prohibited by the U.S. Bureau of Alcohol, Tobacco, and Firearms and in most foreign countries. See 49 Fed. Reg. 37510-37530, (Sept. 24, 1984). Other methods for producing low-alcohol beer that also cause the removal of water, such as vacuum distillation and reverse osmosis, may not be applicable to wine because of this. Where the ethanol content of distilled spirits such as whiskys is reduced by dilution with water, the product must be labelled as "diluted," and this is undesirable from a marketing standpoint.

Efforts have been made to produce low ethanol wine through flash evaporation (Boucher, U.S. Pat. No. 4,405,652, 1984). The beverage is heated and passed rapidly through a centrifugal evaporator under partial vacuum where the ethanol is vaporized and removed. The drawback of this process is that it does not discriminate between ethanol and other volatile components in the beverage; aroma components in particular are depleted together with the ethanol. In addition, even brief exposure of wines to superambient temperatures of about 30° C. and above can degrade certain flavor and aroma components or caramelize sugars in those beverages. The resultant burnt taste is distinct and objectionable.

Pervaporation can best be described as membrane-mediated evaporation (Mulder et al., 1983, J. Membrane Sci. 16: 269-284 and Neel and Aptel, 1982, Entropie No. 104: 15-40 and Daicel Chemical Co., Japan Patent No. 60-106504, issued Dec. 6, 1985). A solution is fed to one side of a membrane. Selected volatile components in the solution diffuse across the membrane to the permeate side which is evacuated or continuously swept with an inert, non-condensable gas stream. The volatile permeants are removed by evaporation. Selectivity in pervaporation is governed by the permselectivity of the membrane and not the relative volatility of the components. For this reason, pervaporation can accomplish selective removal of ethanol over other volatile components if a membrane permselective toward ethanol is used. In conventional implementations of pervaporation, a hydrophobic membrane with low water permeability is used to limit water loss. The result is significant loss of volatile congeners given their significant solubilization in, and permeation across, the non-polar polymer membrane. Using a hydrophilic membrane instead of a hydrophobic membrane would help preserve the volatile, relatively non-polar congeners in the feed beverage, but the consequent water loss would introduce problems similar to those with reverse osmosis, i.e., part or most of the native water in the beverage may be exchanged as described in Section 2.2., supra. As discussed supra, loss of volatile flavor components is frequently observed when water is removed from the beverage. Basically, membrane materials with good ethanol permeability also exhibit some water permeability because of the chemical similarities of those two permeants, so the water-barrier property of those membranes is necessarily compromised. For these reasons, beverages produced via conventional pervaporation may be of low quality.

Therefore, it is the object of this invention to provide for the removal of ethanol and other low-molecular-weight organic solutes from aqueous solutions of these solutes —and in particular, from alcoholic beverages— with a process having the following characteristics:

(1) Ethanol should be removed as selectively as possible, i.e. with minimal simultaneous removal of water.
(2) Ethanol should be removed in such a way that addition of water to or removal of water from the product is avoided.
(3) Most organic compounds present in the beverage other than ethanol should be retained in the beverage during ethanol removal to the greatest degree possible.

SUMMARY OF THE INVENTION

Methods and apparatus are disclosed for selectively removing ethanol from alcoholic beverages. In one embodiment, ethanol may be removed by extraction through the use of membranes in conjunction with ethanol-recovery extraction fluids that have the properties of absorbing permeated ethanol as it issues from the membrane while neither absorbing water from the beverage nor contributing additional water to the beverage. Additionally, the properties of the membranes and/or extraction fluids are chosen such that many of the other desirable organic constituents or congeners of the alcoholic beverage are not simultaneously co-extracted with the ethanol to an excessive degree. As a result, organic constituents of the alcoholic beverage which contribute to its aroma and flavor are retained, while the alcohol content of the beverage is selectively reduced. The finished reduced-alcohol product thus retains the flavor of the original alcoholic beverage but has an alcohol content that is up to about 95% lower than that of the starting material.

The present invention in a specific embodiment, relates to exposing one side of a membrane to a beverage and the other side of the membrane to a gas-phase extraction fluid, and equalizing the water activities in the liquid and throughout the gas-phase with water vapor in the gas-phase extraction fluid and may be referred to as vapor arbitrated pervaporation. The membrane used in this invention should be selectively permeable to ethanol in preference to the flavor and aroma components in the beverage. The gas-phase extraction fluid may consist of a non-condensable gas and water vapor at or near atmospheric pressure, or it may consist of a partial vacuum and water vapor. The vapor may contain or have added to it other organic or inorganic materials. Under the prescribed conditions, ethanol permeates from the beverage across the membrane into the gas-phase. Permeation of the flavor and aroma components is impeded by the membrane. Furthermore, the presence of sufficient water vapor in the gas-phase extraction fluid to provide a water activity approximately equal to that in the beverage inhibits water transport across the membrane, independent of the ethanol/water selectivity of the membrane.

The methods of this invention offer substantial advantages over previously available methods which use immature grapes, arrested fermentation, evaporative or conventional pervaporation processes, or reverse osmosis, all of which tend to produce low-alcohol beverages.

BRIEF DESCRIPTION OF THE FIGURES

The present invention may be more readily understood by reference to the following figures, wherein.

DETAILED DESCRIPTION OF THE INVENTION

Figure 1:
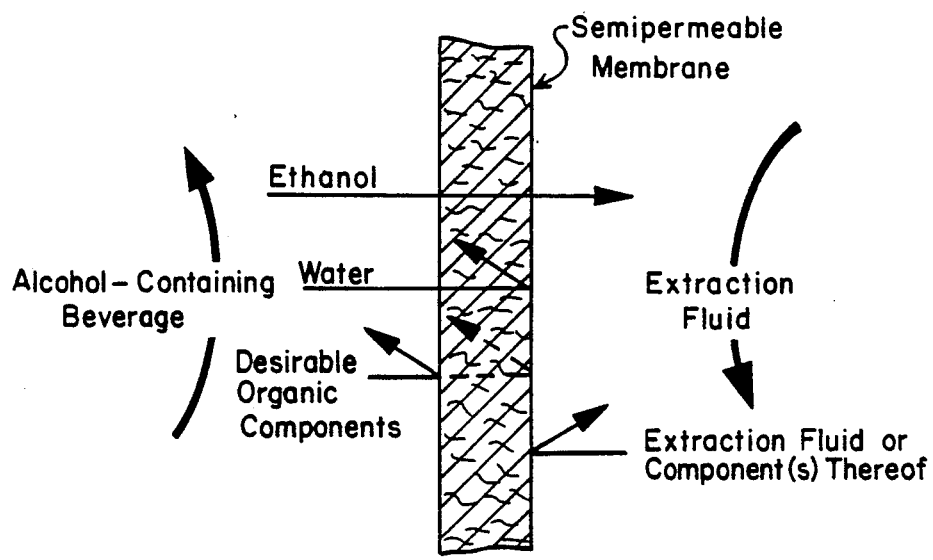
FIG. 1 is a schematic representation of the basic membrane extraction process, wherein an alcohol-containing beverage and an extraction fluid move, optionally but preferably in countercurrent fashion, on opposite sides of a permselective membrane, so that only ethanol permeates into the extraction fluid.

The present invention pertains to the selective removal of ethanol by extraction from alcoholic beverages while simultaneously preserving the congener and water contents originally present in the beverage. Each of the problems identified above with existing technologies has been addressed by the process described herein. Removal of ethanol by extraction is illustrated in FIG. 1. As shown, a semipermeable membrane is interposed at the interface between the alcoholic beverage that is to be processed and an appropriate gaseous extraction fluid. Certain desirable organic components or congeners of the beverage are unable to pass through the permselective membrane and into the extraction fluid; additionally, the extraction fluid itself may exhibit a degree of selectivity for the preferential volatilization of ethanol over the other, desirable organic components. In this manner, preferential removal of ethanol over other desirable organic solutes in the beverage is realized.

A second aspect of the invention is its ability to selectively remove ethanol in preference to water. A distinguishing feature of this invention is that the membrane need not be selectively permeable to ethanol over water. Indeed, the overall process can exhibit remarkable ethanol/water removal selectivity, even when water would normally be capable of freely permeating the membrane along with ethanol. This performance results from the characteristics of the extraction fluid. In particular, the extraction fluid is chosen such that it does not absorb permeated water from the wine or other alcoholic beverage being treated, nor does the extraction fluid donate water to the alcoholic beverage.

The present invention provides a method for producing from a first alcoholic beverage a second beverage of reduced alcoholic content comprising the steps:
providing a membrane which is alcohol permeable;
feeding a first alcoholic beverage across a feed side of said membrane;
feeding a gas-phase extraction fluid across a permeate side of said membrane, said extraction fluid being alcohol absorbing, but substantially not water absorbing and said extraction fluid comprising water vapor in an amount sufficient to minimize the diffusion of water from said first alcoholic beverage to said permeate side of said membrane by balancing the activity of water on said feed side of said membrane so as to evaporate into said gas-phase extraction fluid the portion of the alcohol initially present in said first alcoholic beverage which has crossed to the permeate side of said membrane, thereby forming from said first alcoholic beverage a second beverage having reduced alcoholic content; and
withdrawing said gas-phase extraction fluid containing water vapor and alcohol from said permeate side of said membrane, whereby said second beverage having reduced alcoholic content is produced on said feed side of said membrane.

Figure 2:
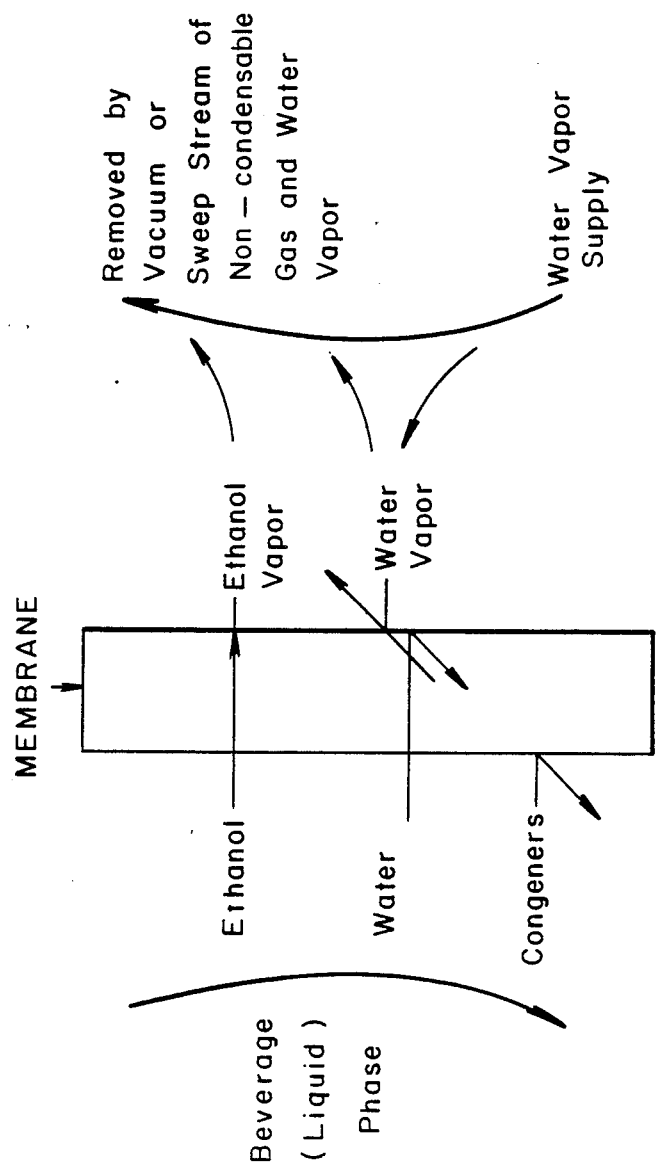
FIG. 2 is a schematic representation of the basic pervaporation process for the removal of ethanol from alcoholic beverages wherein the water activity is equalized in the liquid phase and gaseous phase by addition of water vapor to the gaseous phase.

The features of the process are depicted conceptually in FIG. 2. The use of a membrane that is more permeable to ethanol than to the congeners ensures that most of the congeners will be retained in the beverage during ethanol removal. The gas-phase extraction fluid may be maintained in the gas-phase using either a non-condensable gas (e.g. air or nitrogen) or vacuum applied from a vacuum pump. The gas-phase extraction fluid further comprises water vapor to balance the water activities on the permeate and feed sides of the membrane, as will be discussed infra.

The gas-phase extraction fluid may also comprise organic or inorganic components so as to prevent the permeation of such components present in the beverage across the membrane. These components may be naturally in the extraction fluid or they may be selectively added hereto. Although the present invention is primarily intended for ethanol removal from beverages, the process concept described herein can be applied generically to the selective removal of one or more volatile components from aqueous solutions while retaining other dissolved components.

The present invention provides for equalizing the permeate-side water activity in the gas-phase and the feed-side water activity in the liquid phase. In so doing, the driving force for diffusional water transport is nullified, and any exchange of the water originally present in the beverage becomes unnecessary.

It should be noted that the terms "equalization" and "equalize" as used herein to describe the relationship of water activities on opposite sides of the membrane is meant to describe four cases: (i) where the water activities on opposite sides of the membrane are precisely identical; (ii) where the water activities on opposite sides of the membrane are approximately the same—i.e., not precisely equal, but roughly in balance; (iii) where the water activities on opposite sides of the membrane are not everywhere equal, but where the deviations from equality of water activities that exist at different points along the membrane surface are largely compensatory (i.e., positive deviations being compensated for by negative deviations) with the result that there is little or no overall flux of water into or from the alcoholic beverage being treated; and (iv) where the water activities on opposite sides of the membrane are not equal at all times during the alcohol removal process, but where the deviations from equality of water activities that exist at different times are largely compensatory with the result that there is no overall flux of water into or from the alcoholic beverage being treated. Ultimately, it is the quality of the treated beverage that is the determinant of how closely the ideal of perfect equality of transmembrane water activities must be approached in the practice of the process of this invention.

In order that there be no water transport across the membrane, the activities of water in the liquid and gas-phase extraction fluid should be equivalent. In other words, there should be no driving force for water in one direction or the other. For this to be achieved, the chemical potential of water in the liquid and gas-phase extraction fluid should be equivalent. The chemical potential of species i may be defined as $$\mu_i = RT \ln \hat{f}_i + \theta(T) \quad (1)$$

where R is the universal gas constant (82.06 mL-atm/°K.-mol), T is temperature (°K.), $\hat{f}_i$ is the fugacity of species i and $\theta(T)$ is a constant. The fugacity of a substance may be defined as the tendency of a substance in the liquid phase to escape into the gaseous phase and vice versa. From equation (1), it follows that at a given temperature, the fugacity of water in the liquid phase, $f_l^w$ should equal the fugacity of water in the gaseous phase $f_g^w$ which gives $$\hat{f}_l^w = \gamma_w x_w f_w = \hat{f}_g^w = y_w \hat{\phi}_w P \quad (2)$$

where
$\gamma_w$ = activity coefficient of water in the liquid
$f_w$ = standard state fugacity of pure liquid water
$x_w$ = mole fraction of water in the aqueous stream
$y_w$ = mole fraction of water in the gaseous stream
$\hat{\phi}_w$ = fugacity of saturated liquid or vapor It should be noted that the activity of a substance in the gaseous or liquid phase is the ratio of the fugacity of the substance at a given temperature T to the fugacity of the substance in the standard state. Therefore, if the fugacity of water in its liquid and gas state are equivalent, it follows that the activities are also equivalent.

$$\text{Since } f_w = \hat{\phi}_w^{sat} P_w^{sat} \exp [V_w^l (p - p_w^{sat})/RT] \quad (3)$$

where $V_w^l$ is the molar volume of liquid water it follows that:

$$\gamma_w x_w P_w^{sat} = Y_w P \quad (4)$$

where $P_w^{sat}$ is the saturation or vapor pressure of water at temperature T, or rearranging, $$Y_w = \gamma_w x_w P_w^{sat} / P \quad (5)$$

The activity coefficient, $\gamma_w$, can be obtained from experimental measurements of partial pressures of water over alcohol/water mixtures. For example, if the liquid stream contains 50 vol % ethanol at 40° C. at a pressure of 760 mm Hg, the mole fraction of water $x_w = 0.719$. The vapor pressure of water at 40° C. is 55.2 mm Hg (CRC Handbook of Chemistry and Physics, 55th ed., CRC Press, Boca Raton, Fla., D-159 to 160). From Table 1, the partial pressure of water at 40° C. and 50 vol % ethanol = 44.6 mm Hg, which is equal to the right hand side of equation 4. Table 3 shows the experimentally measured partial pressures of water ($P_w$) and ethanol ($P_e$) as a function of vol % ethanol. Therefore, $$\gamma_w x_w P_w^{sat} = 44.6 \text{ mm Hg}$$
$$\gamma_w = 44.6/(0.719)(55.2)$$
$$= 1.12$$
$$y_w = (1.12*0.719*55.2)/760$$
$$= 0.0585$$

Figure 3:
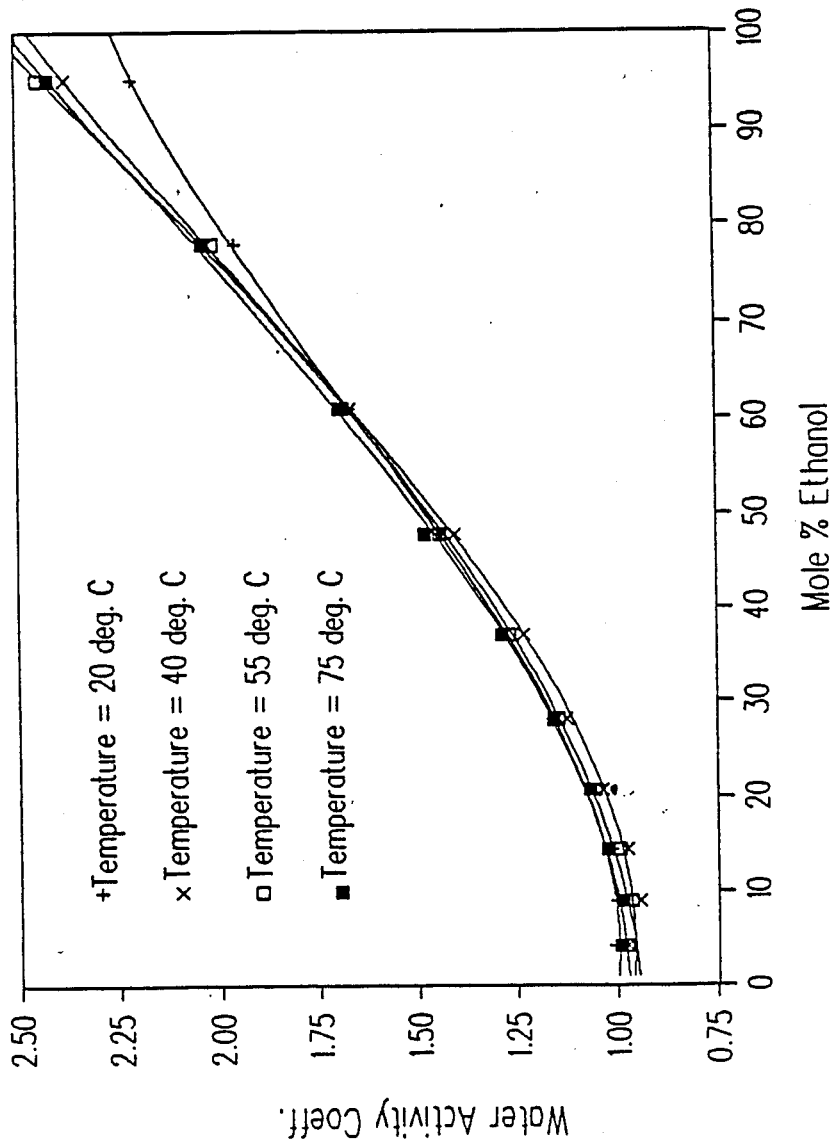
FIG. 3 shows a plot of the activity coefficient of water as a function of mole % ethanol in the liquid phase.

FIG. 3 shows activity coefficient of water vs. mole fraction of ethanol in an aqueous phase.

TABLE 1

| Vol. % Eth- anol | Temp = 20° C. | | 40° C. | | 55° C. | | 75° | |
|---|---|---|---|---|---|---|---|---|
| | $P_w$ | $P_e$ | $P_w$ | $P_e$ | $P_w$ | $P_e$ | $P_w$ | $P_e$ |
| 0 | 17.5 | 0.0 | 54.3 | 0.0 | 117.0 | 0.0 | 287.0 | 0.0 |
| 10 | 16.8 | 6.7 | 51.6 | 26.9 | 110.7 | 59.3 | 276.0 | 144.0 |
| 20 | 15.9 | 12.6 | 47.6 | 43.5 | 104.0 | 94.4 | 261.0 | 218.8 |
| 30 | 15.1 | 17.1 | 46.2 | 54.7 | 100.5 | 114.8 | 254.0 | 269.2 |
| 40 | 14.7 | 20.7 | 45.5 | 62.5 | 98.8 | 130.8 | 245.0 | 305.0 |
| 50 | 14.5 | 23.5 | 44.6 | 68.3 | 97.3 | 142.6 | 241.0 | 336.0 |
| 60 | 14.1 | 25.6 | 42.9 | 74.8 | 94.4 | 155.6 | 235.0 | 365.0 |
| 70 | 13.1 | 28.0 | 40.5 | 82.8 | 89.1 | 172.6 | 224.0 | 405.0 |
| 80 | 11.3 | 31.2 | 35.9 | 91.8 | 77.6 | 192.8 | 191.4 | 454.0 |
| 90 | 7.5 | 35.8 | 24.7 | 106.4 | 52.5 | 223.9 | 130.3 | 527.0 |
| 98 | 1.9 | 42.3 | 6.5 | 123.0 | 14.3 | 262.4 | 34.7 | 625.0 |
| 100 | 0.0 | 43.6 | 0.0 | 134.0 | 0.0 | 283.0 | 0.0 | 667.0 |

Obtained from International Critical Tables of Numerical Data, Physics, Chemistry and Technology, vol. III. 1st ed., McGraw Hill, N.Y.C., 1928.
$P_w$ and $P_e$ are in units of mm Hg Once $y_w$ is known, relative humidity which is equal to the ratio of the partial pressure of water to the saturation pressure (or vapor pressure) at the prevailing temperature can be determined by equation (6).

$$\text{Relative Humidity } (\%) = (Y_w P / P_w^{sat}) \times 100 \quad (6)$$

Figure 4:
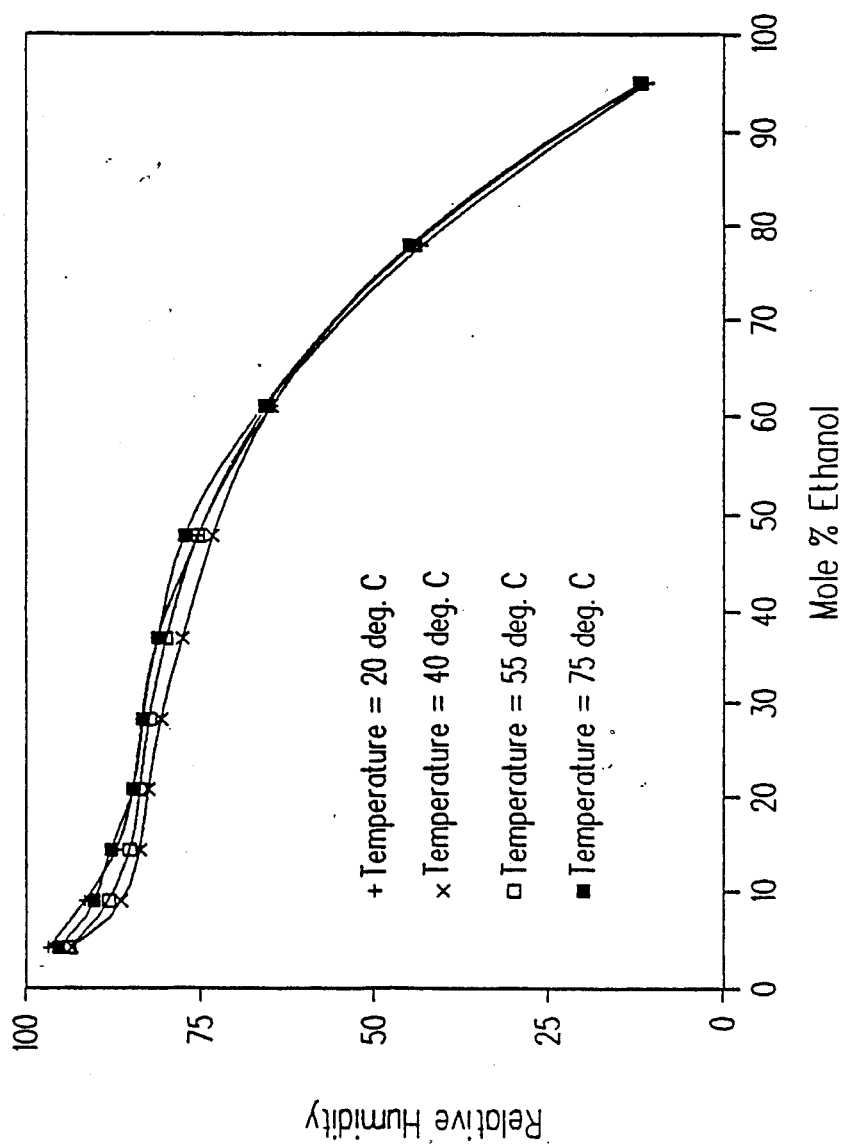
FIG. 4 shows a plot of the relative humidity required to prevent water transport across the membrane as a function of mole % ethanol in the liquid phase.
Figure 5:
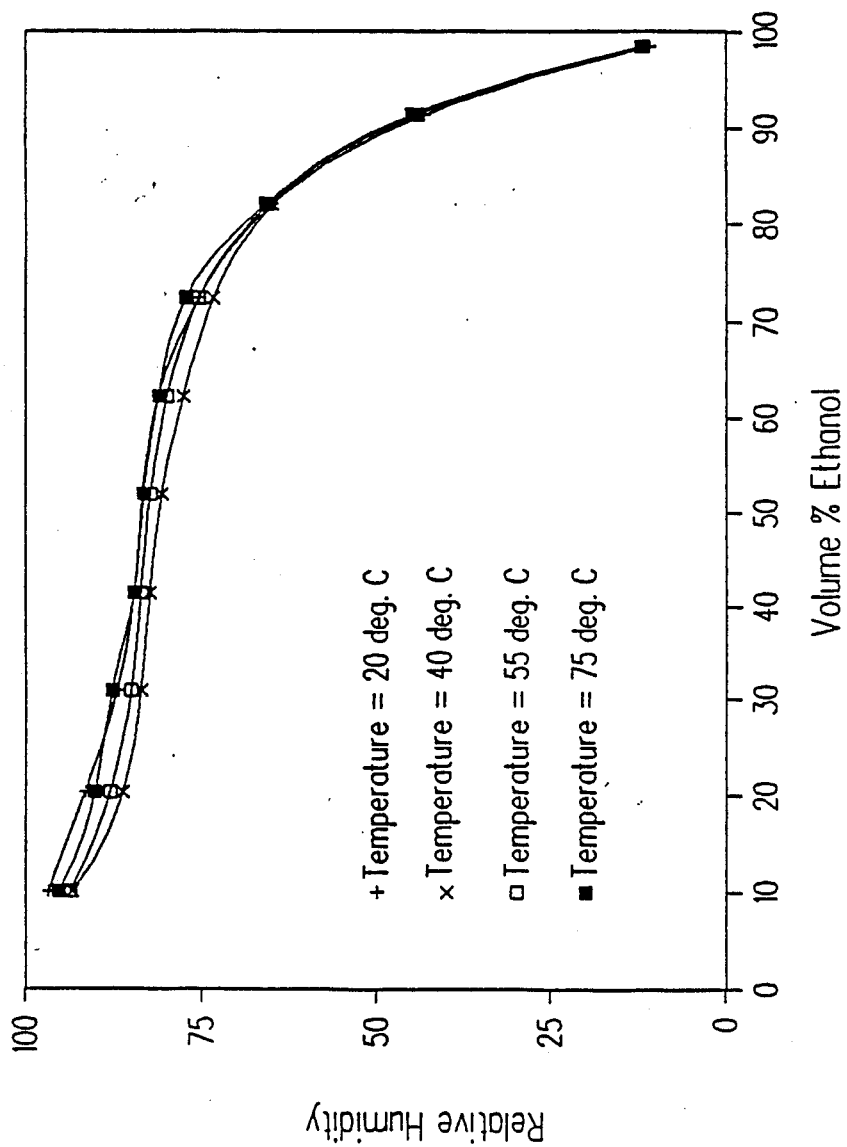
FIG. 5 shows a plot of the relative humidity required to prevent water transport across the membrane as a function of volume % ethanol in the liquid phase.

Therefore, the relative humidity required to prevent water transport across the membrane when $y_w = 0.0585$, $P = 760$ mm Hg and $P_w^{sat} = 55.2$ mm Hg would be 80.5%. The relative humidity required to prevent water transport across the membrane as a function of mole % ethanol and as a function of vol % ethanol in the liquid stream is plotted in FIGS. 4 and 5 respectively.

Commercially available alcoholic beverages which include but are not limited to beer, wine, brandy and distilled spirits have an initial ethanol content of from about 5 to about 75 volume %. Correspondingly, the relative humidity should be maintained at about 60 to about 95% at about 5° C. to about 75° C. Specifically, if the alcoholic beverage is a beer with an initial ethanol content of from about 5 to about 10% by volume, the relative humidity should be maintained at about 95% to about 100% at about 5° C. to about 75° C. If the alcoholic beverage is a wine with an initial ethanol content from about 9 to about 13% volume, the relative humidity should be maintained at about 85 to 95% at about 5° to about 75° C. If the alcoholic beverage is a brandy with an initial ethanol content from about 35 to about 55 volume %, the relative humidity should be maintained at about 80 to 90% at about 20° to about 75° C. If the alcoholic beverage is a distilled spirit with an initial ethanol content from about 50 to about 70 volume %, the relative humidity should be maintained at about 75 to about 85% at about 20° C. to about 75° C. In some cases, processing temperatures below about 20° C. or above about 75° C. may be desirable. The same principle of relative humidity adjustment applies generally at those other temperatures.

A variety of process schemes are possible for equalizing feed- and permeate-side water activities in pervaporation. The invention also relates to an apparatus for producing from a first alcoholic beverage a second beverage of reduced alcoholic content comprising a membrane which is alcohol permeable;

means for feeding a first alcoholic beverage across a feed side of said membrane; and means for providing a gas-phase extraction fluid to a permeate side of said membrane;

means for regulating the relative humidity of said gas-phase extraction fluid on said second side of said membrane; and whereby alcohol diffuses from the first beverage through the membrane into said gas-phase extraction fluid to produce said second beverage on the first side of said membrane having reduced alcohol content and a gas-phase extraction fluid comprising water vapor and alcohol on the second side of said membrane. Example embodiments of the technology are described below. It is assumed in all cases that relatively polar, hydrophilic membranes with good ethanol/congener selectivity are used.

Although the present invention is primarily intended for ethanol removal from beverages, the concept described herein can be applied generically to the selective removal of one or more volatile components from aqueous solutions while retaining other dissolved components.

VAPOR-SWEPT SYSTEMS

Figure 6:
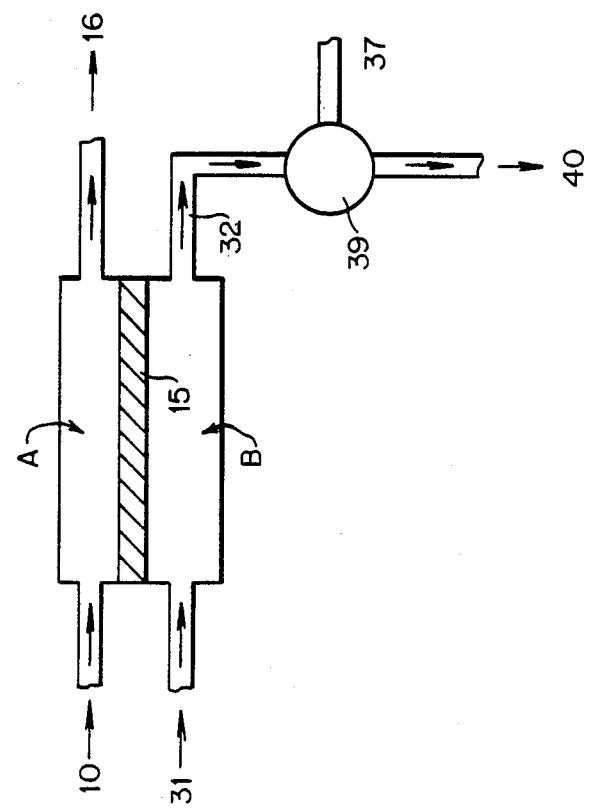
FIG. 6 is a schematic representation of a vapor-swept pervaporation process with feed- and permeate-side water activity equalization and ethanol recovery.

A preferred vapor-swept pervaporation system embodying the water activity management concept is shown conceptually in FIG. 6. A membrane unit comprises two flow compartments, one on each side of the membrane 15. Beverage 10 is fed to compartment A of the membrane unit, a gas-phase extraction fluid 31 comprising a mixture of non-condensable gas (such as air or nitrogen) and water vapor is fed to the other compartment B as a sweep stream. A feed subsystem regulates the delivery rate and the temperature of the beverage; it also replenishes the latent heat of evaporation lost from the feed stream during ethanol pervaporation. A humidification subsystem is used to regulate the temperature, relative humidity (and thus activity), and flow rate of the sweep stream. The beverage emerges with a reduced alcoholic content 16. An alcohol recovery subsystem 39 separates the water and ethanol 40 from the non-condensable gas 37 in the gas-phase extraction fluid that emerges 32. Provided that the sweep stream flow rate is sufficiently high to prevent excess ethanol accumulation on the permeate side of the membrane, the pervaporation and purging actions will continue to sustain ethanol reduction. Another function of the sweep stream is to help supply part of the latent heat of ethanol evaporation.

Figure 7:
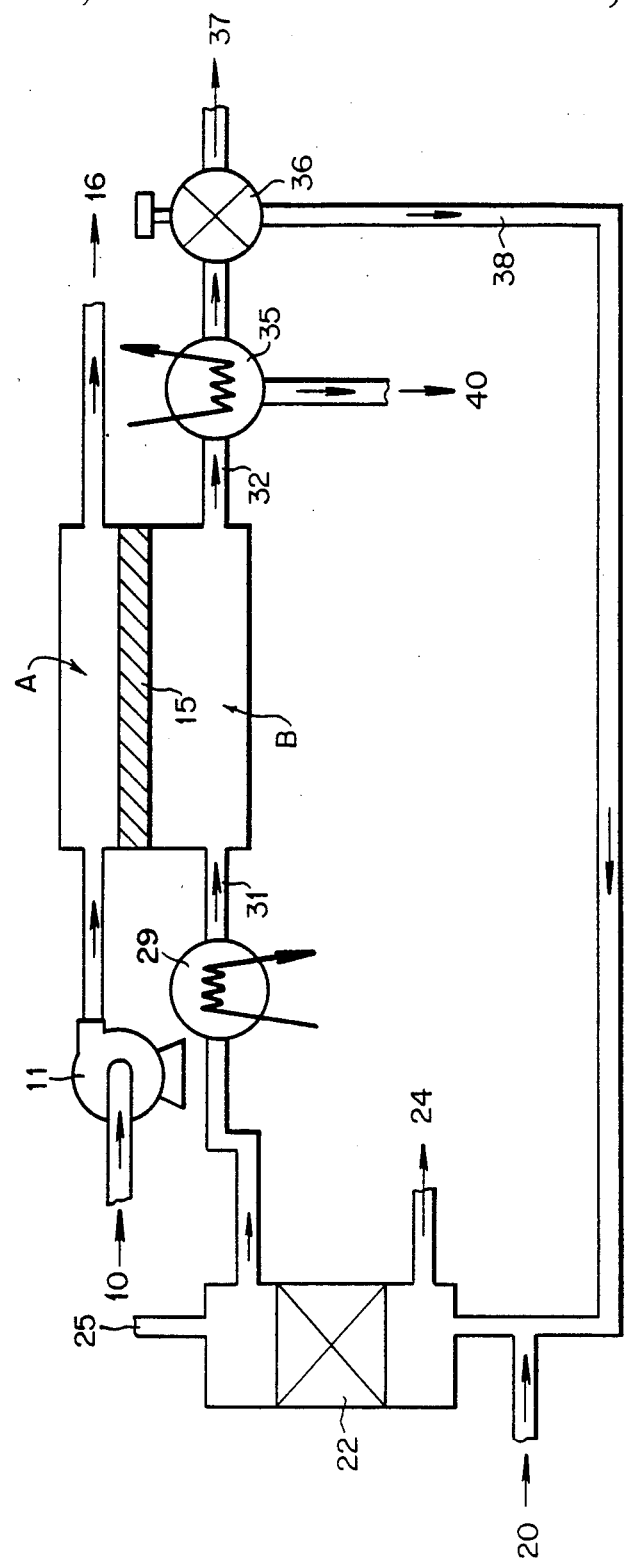
FIG. 7 shows a schematic representation of a process whereby liquid water entering a gas-liquid contactor is vaporized into a non-condensable gas. Ethanol is recovered by using a condenser.

Another preferred embodiment of the humidification subsystem is shown in FIG. 7. The beverage 10 is circulated via a pump 11 to compartment A of the membrane unit containing membrane 15. The beverage emerges with a reduced alcoholic content 16. Liquid water 25 is vaporized into the non-condensable gas 20 in a gas liquid contactor 22 (e.g. a spray tower, packed column, etc.). Excess water may be removed via an outlet 24. The temperature $T_s$ inside the contactor 22 (approximately equal to that of the incoming water) is set to produce a water loading of the gas which, upon heating with a process heater 29 to the operating temperature T of the resulting gas-phase extraction fluid 31, will give exactly the desired relative humidity. The process heater may be for example a steam or electrical heater, a heat exchanger, or some other heat source operated at a temperature sufficiently high to give the desired relative humidity. The gas-phase extraction fluid that emerges from compartment B of the membrane unit, comprising non-condensable gas, water vapor, ethanol vapor, and other volatile organic components (e.g. congeners) 32 may be cooled with a condenser 35 and the liquified ethanol solution 40 may be collected. The non-condensable gas, stripped of water and ethanol vapors, can be vented 37 via a valve 36 or recycled 38 to the humidification system. Recycling is desirable in some cases. For example, nitrogen may be used as the non-condensable gas for the purpose of minimizing oxidation of the beverage; but disposal of the gas after a single pass through the membrane unit would be uneconomical. Another reason for recycling is to allow certain permeated congeners to accumulate in the gas stream so as to deter further loss of those congeners from the beverage. Optionally, the temperature and flow rate of the incoming non-condensable gas stream may be adjusted so that the gas does not become saturated with water vapor in the liquid-gas contactor, rather, the exiting gas stream would have the required temperature and relative humidity with no further heating or cooling.

Figure 8:
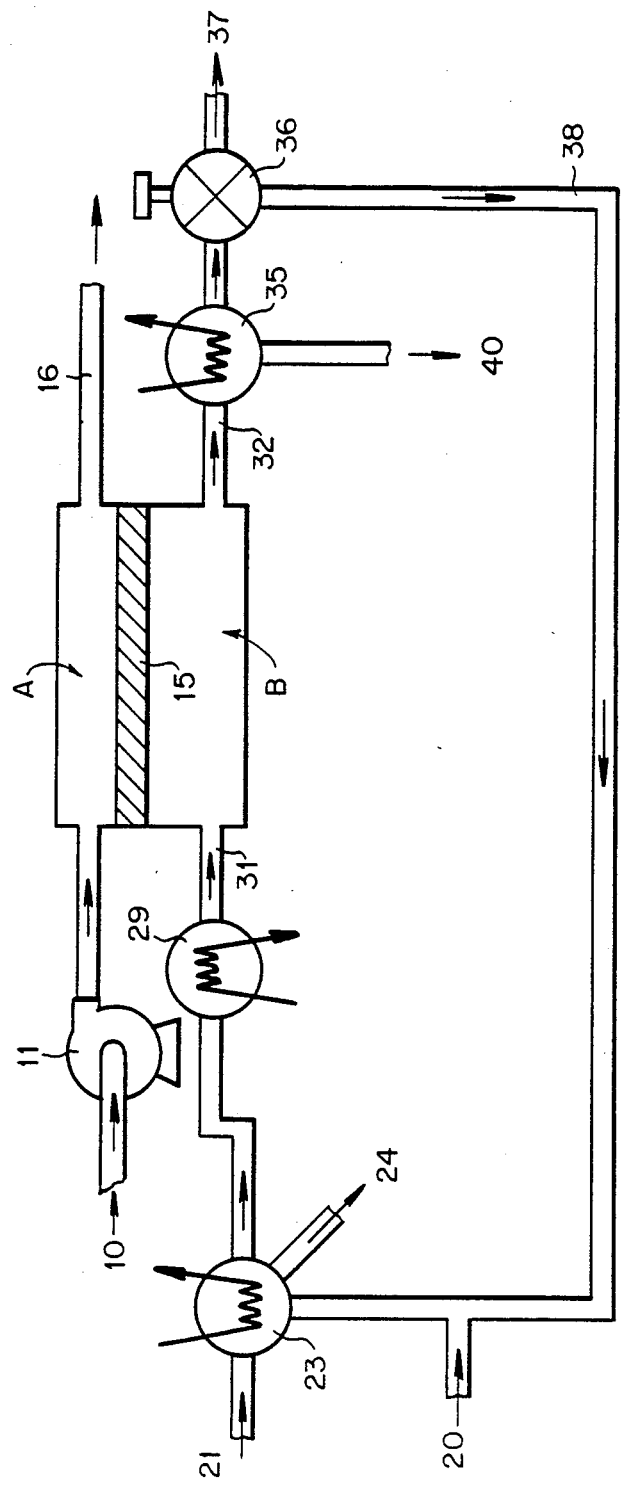
FIG. 8 shows a schematic representation of a process whereby an excess of steam is mixed with the non-condensable gas in a condenser to produce a water-saturated exit gas stream. Ethanol is recovered with a condenser.

Another preferred embodiment is shown in FIG. 8. As in FIG. 7, the beverage 10 is circulated via a pump 11 to compartment A of the membrane unit containing membrane 15. The beverage emerges with a reduced alcoholic content 16. Steam 21 is mixed with the non-condensable gas 20 in a condenser 23 to produce a water-saturated gas-phase extraction fluid at $T_s$. Excess water condensed from the steam 24 is removed from the condenser 23. Again, the gas-phase extraction fluid is heated to temperature with a process heater 29 to produce a gas-phase extraction fluid 31 having the desired relative humidity. Optionally, injection of steam at a precisely controlled rate into a pre-conditioned air stream may be feasible as a means of generating the desired humidified air sweep stream in a single step. The condenser 23 in this case would function as a mixing chamber for air and steam and no reheater would be required. As described for FIG. 7, the gas-phase extraction fluid that emerges 32 from compartment B of the membrane unit may be cooled with a condenser 35 and the liquified ethanol solution 40 may be collected. The non-condensable gas may be vented 37 via a valve 36 or recycled 38 to the humidification system.

Figure 9:
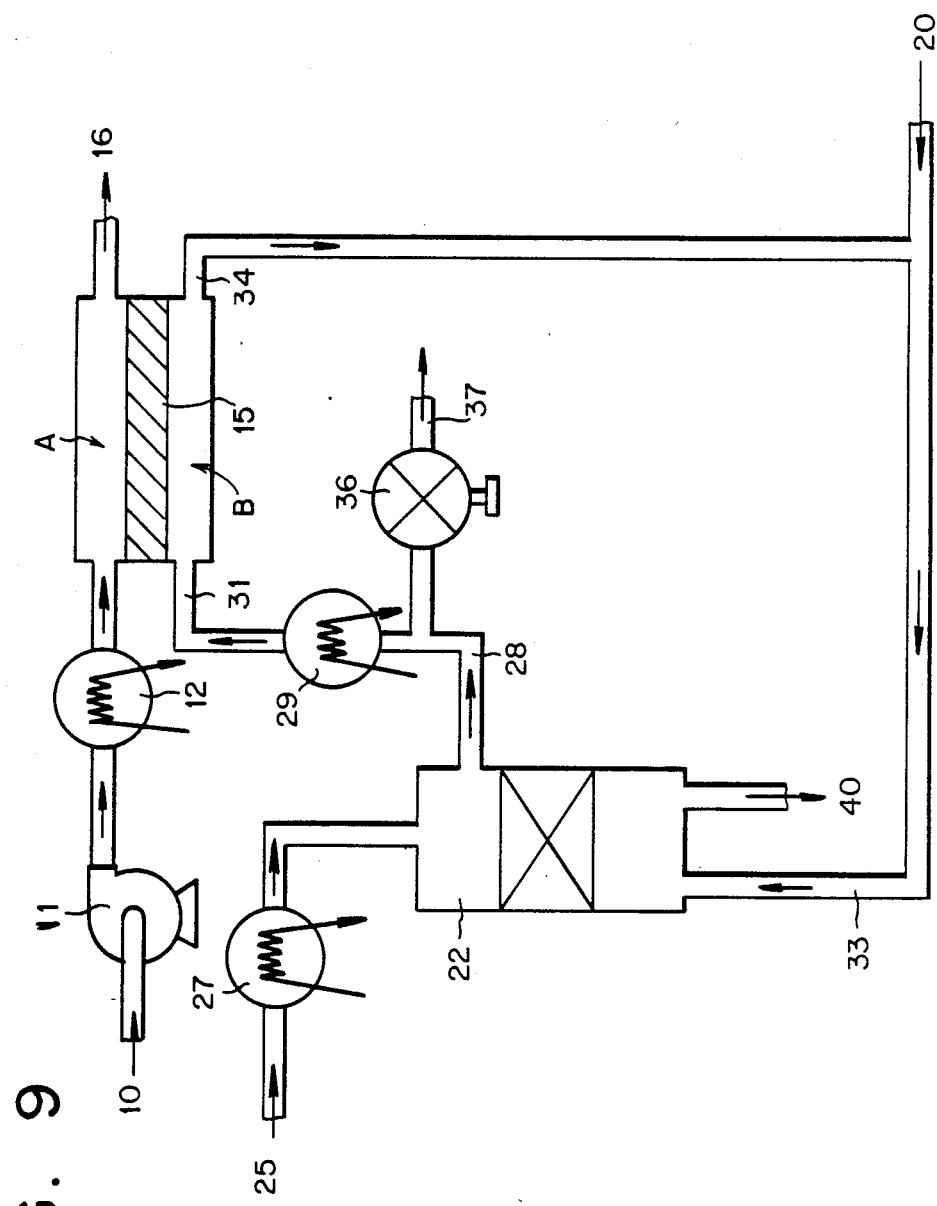
FIG. 9 is a schematic representation of a process which combines the humidification and ethanol recovery subsystems in the form of a gas-liquid contactor.

Yet another preferred embodiment of the present invention combines the humidification and ethanol recovery subsystems in the form of a gas-liquid contactor. A schematic diagram of such a process is shown in FIG. 9. As described in FIGS. 7 and 8, beverage 10 is circulated via a pump 11 to compartment A of the membrane unit containing membrane 15 to produce a beverage of reduced alcoholic content 16. In this embodiment, the alcoholic beverage is heated to the operating temperature with a process heater 12. As in FIGS. 7 and 8, an alcohol reduced beverage 16 is produced. Liquid water 25 which is heated by the process heater 27 enters the gas-liquid contactor 22 where it is vaporized into the non-condensable gas-phase extraction fluid 33. The gas-phase extraction fluid may comprise fresh non-condensable gas 20 and recycled gas-phase extraction fluid 34 that has passed through compartment B of the membrane unit. The contactor strips the ethanol from the gas-phase extraction fluid 33 entering the gas-liquid contactor, to produce an ethanol-water mixture 40 and simultaneously resaturates the gas-phase extraction fluid 28 at temperature $T_s$. A process heater 29 then raises the temperature of the gas-phase extraction fluid 31 that enters the membrane unit to the operating temperature T. Alternatively some of the humidified non-condensable gas may be vented 37 via a valve 36.

Figure 10:
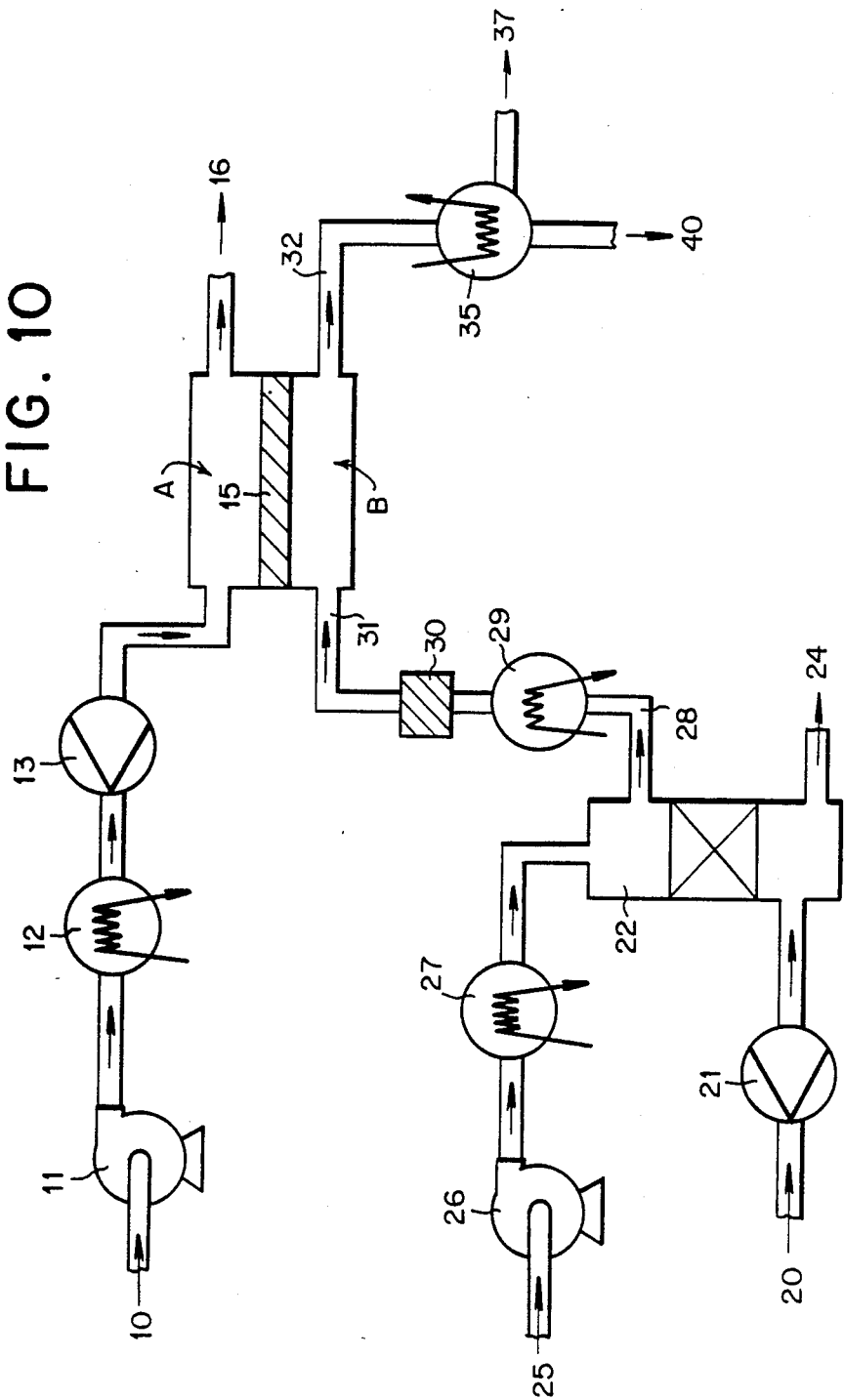
FIG. 10 shows a bench-scale apparatus for pervaporation removal of ethanol from beverages using a vapor-swept system.

In another preferred embodiment, as shown in FIG. 10, the alcoholic beverage 10 is circulated with a pump 11 to compartment A of the membrane unit containing membrane 15. A process heater 12 may be used to maintain the feed stream at an operating temperature T. A flowmeter 13 may be used to adjust the flow rate of the beverage stream. The gas-phase extraction fluid 31, supplied to compartment B of the membrane unit may be produced by pumping air 20 through a separate column 22 where it contacts water 25 heated with a process heater 27 at a temperature $T_s$ to reach saturation. A flowmeter 21 may be used to monitor the flow rate of the air, 20. A pump 26 may be used to control the flow rate of the water. Excess water may be removed via an outlet 24. The saturated gas-phase extraction fluid 28 may then be reheated with a process heater 29 to the operating temperature T to attain a relative humidity governed by the temperature rise (T-$T_s$). $T_s$ may be determined from a given T and the required relative humidity by using the procedure described in Section 5, Table 1, and FIGS. 3 or 4. Equalizing the temperature of the feed and sweep streams, although optional, may help maintain a uniform relative humidity along the permeate side of the membrane by reducing transmembrane heat transfer beyond that associated with pervaporation of ethanol. The apparatus may be equipped with an automatic humidity control system 30 that monitors the relative humidity of the gas-phase extraction fluid 31 at the entrance to the membrane module, and adjusts the saturation temperature, $T_s$ to compensate for deviations from the relative humidity set point. The gas-phase extraction fluid 32 exiting from the membrane module is sent to a condenser 35 where water and the pervaporated ethanol 40 are liquified and collected. A thin-film composite membrane comprising an interfacially crosslinked polyurea membrane supported by an asymmetric, microporous polysulfone substrate is preferred.

VACUUM SYSTEMS

Figure 11:
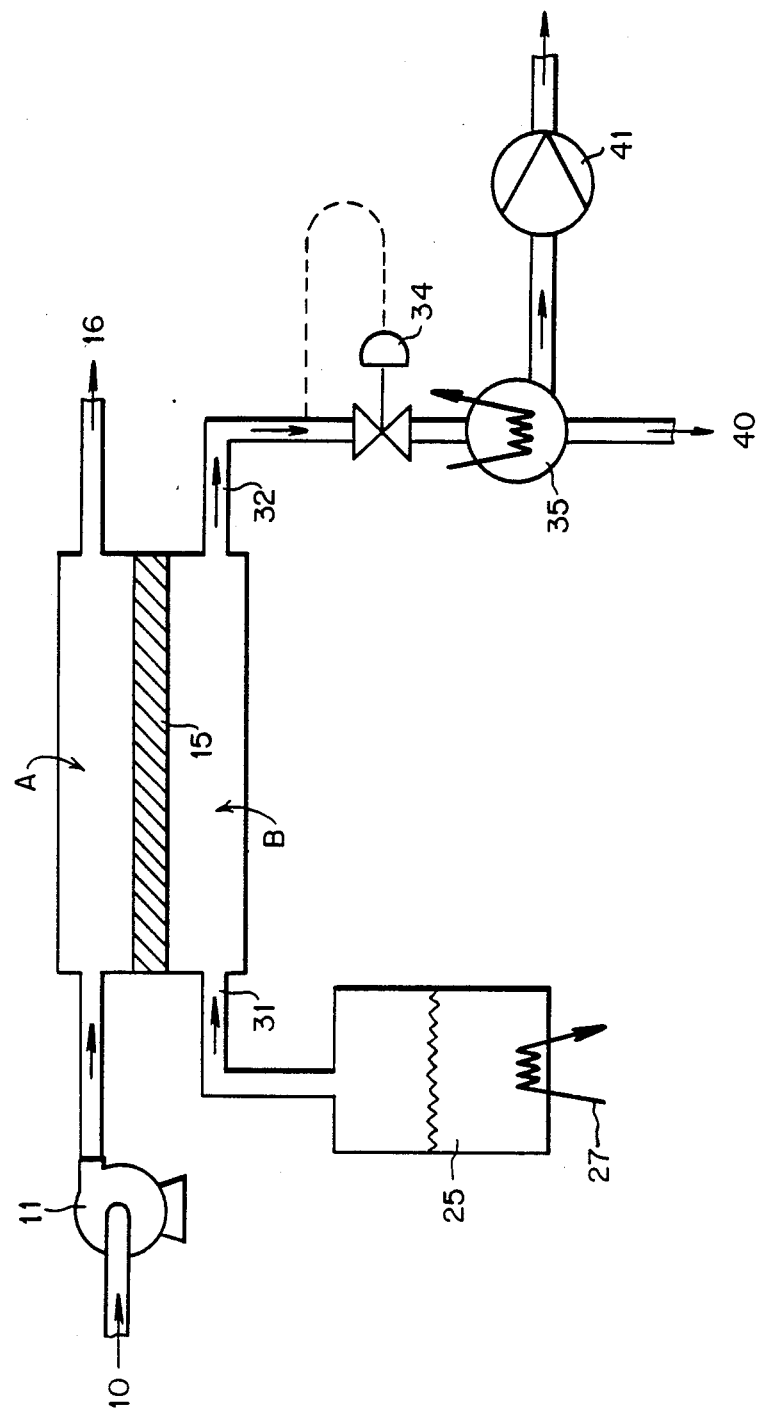
FIG. 11 is a schematic representation of a pervaporation system with permeate removal by vacuum and permeate-side water activity control.

A pervaporation system embodying the water-activity equalization concept but which uses vacuum to remove the permeate is depicted to FIG. 11. Beverage 10 is fed into compartment A of the membrane unit containing membrane 15 via a pump 11 to produce a beverage of reduced alcoholic content 16. The inlet to the permeate side of the membrane unit is connected to a water reservoir 25 equipped with a heater 27. Compartment B of the membrane unit is connected, sequentially to a back-pressure regulator 34, a condenser 35, and a vacuum pump 41. This arrangement is used to regulate water vapor supply to the gas-phase extraction fluid 31 entering the permeate side of the membrane while continuously removing the pervaporated ethanol from the emerging gas-phase extraction fluid 32. To obtain a water activity less than unity, the water vapor is supplied at a partial pressure lower than its vapor pressure at that temperature. This is accomplished by adjusting the back-pressure regulator 34 to open whenever the permeate-side pressure is in excess of the target partial pressure. Ethanol and water vapors 40 released through the back-pressure regulator 34 may be condensed and recovered.

MEMBRANES

The membranes used in the methods of the present invention must have a high ethanol/congener selectivity when ethanol is removed by extraction with gas-phase extraction fluids. Specifically, the membranes should be highly permeable to ethanol and be permselective between ethanol and other organic components of the beverage. Bearing these limitations in mind, a number of types of membranes have potential applicability in this invention, and the choice will be influenced by economic considerations, the ethanol compatibility of the membrane, and its availability in high-surface-area configurations. For example, membranes constructed of crosslinked or uncrosslinked polymeric materials or more loosely organized elastomeric materials are suitable. Membranes that are now used for reverse osmosis (RO) are good candidates for use in this invention, because RO applications entail high transmembrane water fluxes of polar permeants (e.g., water). Membranes that permit rapid water permeation usually will be significantly permeable to ethanol as well.

Membranes which exhibit ethanol fluxes adequate for the present invention should be thin, nonporous, and may be derived from polymers that are crosslinked or uncrosslinked, glassy or rubbery, and water-swollen to various degrees. In our tests (per Examples 1 to 5), ethanol fluxes ranging from about 0.04 to 0.09 mL/$cm^2$-hr have been observed with a thin-film-composite crosslinked polyurea membrane, depending on the ethanol concentration in the feed beverage. Related permeation tests conducted in our laboratory comparing various membrane types showed the following relative ethanol fluxes (see Table 2):

TABLE 2

Relative Ethanol Removal Rates Among Different Membranes

| Membrane | Relative Ethanol Flux |
| --- | --- |
| Crosslinked polyurea | 1 |
| Crosslinked polyamide | 0.67 |
| Cellulose acetate | 1.3 |
| Cellulose triacetate | 1.7 |
| Crosslinked polyvinyl-alcohol | 1.8 |
| Sulfonated polybenzimidazole | 1.7 |

The literature contains numerous references to membranes of varied compositions and structures. In general, membranes that are relatively hydrophilic (i.e. exhibiting higher permeabilities to water and ethanol than to higher alcohols) with fluxes comparable to those mentioned above should be suitable from a productivity standpoint.

Table 3 shows the ethanol/congener selectivity of a hydrophilic, crosslinked polyurea membrane in terms of congener/ethanol permeability ratios. Clearly, ethanol permeated more rapidly across the membrane than did the higher alcohols and other congeners (with the exception of methanol—a desirable attribute because of the relatively high toxicity of that alcohol).

TABLE 3

Selectivity Characteristics Of A Suitable Alcohol Reduction Membrane

| Congener | Permeability relative to that of ethanol |
| --- | --- |
| Methanol | 1.41 |
| Ethanol | 1 |
| 1-Propanol | 0.092 |
| i-Butanol | 0.10 |
| active Amyl alcohol | 0.081 |
| i-Amyl alcohol | 0.072 |
| Ethyl acetate | 0.44 |
| i-Amyl acetate | 0.45 |
| Acetic acid | 0.09 |

In view of the above considerations, a number of membrane types may be useful for the selective removal of ethanol from alcoholic beverages, including but not limited to various aliphatic and aromatic polyamides, polyureas, polyetherureas, polyimides, polyoxazolines, polyetheraminotriazine, regenerated cellulose, cellulose acetate, cellulose triacetate, crosslinked polyvinyl alcohol, polyacrylonitrile and its copolymers (these polymers being particularly resistant to ethanol swelling), polybenzimidazole, and polybenzimidazolone, hydrophilic crosslinked vinyl polymers and copolymers, and ion-exchange membranes with various counterions.

Any membrane geometry is potentially applicable. In one embodiment, a hollow-fiber module with high membrane area-to-module volume ratio is used. The flow of alcoholic beverage may be directed through the lumen of the hollow fibers and the gas-phase extraction fluid along the exterior shell of the fibers, or vice versa. The preferred configuration will depend on the pressure capability, wettability, and porosity of the fibers, as well as on the hydrodynamic and mass transfer characteristics of the modules containing them. The preferred operating pressures of the process depend on the specific embodiment. With humidified non-condensable gas as the sweep stream, the preferred gas stream pressure would be at 1 atm, or fractionally above 1 atm consistent with membrane module and piping pressure drops. The beverage stream will similarly be held at or about 1 atm to minimize the transmembrane pressure. Where vacuum operation is the preferred method of removing the pervaporated ethanol, then the permeate side of the membrane will be maintained at subatmospheric pressures.

EXAMPLES

Examples of the practice of the invention are as follows. Examples 1-5 describe the removal of ethanol by the special pervaporation process of this invention.

EXAMPLES NOS. 1-2

An alcohol reduction apparatus shown schematically in FIG. 10 comprises a membrane module, a feed beverage recirculation subsystem, an air supply subsystem with adjustable flow rate, temperature, and relative humidity, and an ethanol recovery subsystem. The membrane module is of a plate-and-frame modular construction that allows circulation on both sides of the membrane unit and contains 1700 $cm^2$ of effective membrane area.

The alcohol-reduced beverage was obtained using substantially the same procedure as described in Section 5.2 supra for the operation of the apparatus shown in FIG. 10. Feed Wine (Robert Mondavi 1985 Cabernet Red Table Wine) was circulated on the feed side of the membrane, while the gas-phase extraction fluid, a humidified air sweep stream, was delivered to the permeate side of the membrane unit. Two wine samples were generated under conditions summarized in Table 4, infra.

TABLE 4

| | Example 1 | Example 2 |
| --- | --- | --- |
| Initial wine volume (mL) | 959 | 315 |
| Initial alcohol concn. (%) | 12.0 | 12.4 |
| Final wine volume (mL) | 889 | 284 |
| Final alcohol concn. (%) | 7.8 | 6.5 |
| Processing time (hrs) | 6.8 | 2.0 |
| Wine temperature (°C.) | 25.2 ± 2 | 27.5 ± 0.1 |
| Wine flow rate (mL/min) | 500 | 420 |
| Sweep air temperature (°C.) | 26.0 ± 1.5 | 26.5 ± 0.3 |
| Sweep air flow rate (L/min) | 11.5 | 11.5 |
| Relative humidity of sweep air stream (%) | 89 ± 6 | 96 ± 3 |
| Ethanol flux ($10^{-3}$ mL/$cm^2$—hr) | 3.9 | 6.0 |
| Water flux ($10^{-3}$ mL/$cm^2$—hr) | 2.6 | 3.7 |

The alcohol-reduced samples retained virtually all of the flavor and bouquet of the original wine. More ethanol was present in the pervaporate than water, showing that alcohol was selectively removed from the beverage. Errors in measuring relative humidities close to the dew point limited the precision of water activity balance across the membrane, with the result that some water also pervaporated from the wine. However, the quantity of water removed represented a much smaller fraction of its original volume in the wine than was the case with ethanol. Thus the alcohol concentration of the finished wine decreased substantially, but the water concentration remained almost unchanged.

EXAMPLE NOS. 3-4

Whiskies are alcoholic distillates from fermented mash of grain, stored in oak containers for maturation. Two examples are disclosed to illustrate the application of the present process to removing ethanol from whiskies. An alcohol reduction apparatus similar to that described in Examples 1 and 2 was equipped with a plate-and-frame membrane stack containing 2030 $cm^2$ of effective membrane area. Feed whisky (Early Times TM) was obtained directly from the barrel nominally at 130 proof, i.e. 65 vol % ethanol. Whisky and humidified air were supplied to the membrane as described in the preceding example (section 6.1, supra). Ethanol in the sweep air stream was recovered in a condenser. The experimental conditions and results are shown in Table 5 infra.

TABLE 5

|  | Example 3 | Example 4 |
|---|---|---|
| Initial whisky volume (mL) | 1160 | 1410 |
| Initial alcohol concn. (%) | 65.3 | 59.7 |
| Final whisky volume (mL) | 670 | 940 |
| Final alcohol concn. (%) | 41.9 | 38.8 |
| Processing time (hrs) | 2.6 | 3.1 |
| Whisky temperature (°C.) | 30 | 30 |
| Whisky flow rate (mL/min) | 500 | 420 |
| Sweep air temperature (°C.) | 30 | 30 |
| Sweep air flow rate (L/min) | 22.5 | 22.5 |
| Relative humidity of sweep air stream (%) | 77 ± 2 | 80 ± 2 |
| Ethanol flux ($10^{-3}$ mL/cm$^2$ hr) | 92 | 77 |
| Water flux ($10^{-3}$ mL/cm$^2$—hr) | 6.9 | 2.4 |
| Ethanol concentration in condensed permeate (%) | 80.0 | 79.9 |

Both alcohol-reduced whisky samples exhibited the taste and aroma character of the original material, but at substantially higher intensity. The product whiskies also showed a deeper amber color compared with the feed. This was due to the very good retention properties of the membrane and the concentration effect associated with the approximately one-third decrease in feed volume after processing.

The high rates of ethanol removal observed were attributable to the high alcohol concentration in whisky. The relative humidity required to balance water activities on the feed and permeate sides of the membrane was about 80%, substantially lower than that needed for processing wines. This is consistent with the fact that whiskies contain less water than do wines and hence have lower water activities. The ratio of ethanol flux to water flux was about 13 in Example 3, and about 32 in Example 4. Water lost from the whisky represented about 1 to 2 percent of the feed volume. This means that almost all of the water in the feed beverage was preserved. Feed whisky flow rates above about 300 mL/min had little effect on the performance of the system.

Notably, the ethanol recovered as condensate was very high in concentration and carries with it a high value as a commodity.

EXAMPLE NO. 5

A brandy is a distilled spirit derived from wine or fermented fruit juice. This example illustrates the alcohol reduction of a cognac (a brandy produced in the Cognac region in France). An alcohol reduction apparatus similar to that described in Examples 1 and 2 was equipped with a plate-and-frame membrane stack containing 1020 cm$^2$ of effective membrane area. The brandy used was Remy Martin VSOP available commercially which contains about 40 vol % ethanol. Feed brandy and humidified air were supplied to the membrane as described in the preceding examples. Ethanol in the gas-phase extraction fluid was recovered in a condenser. Experimental conditions and results are shown in Table 6, infra.

TABLE 6

| Initial brandy volume (mL) | 775 |
|---|---|
| Initial alcohol concn. (%) | 38.5 |
| Final brandy volume (mL) | 675 |
| Final alcohol concn. (%) | 28.6 |
| Processing time (hrs) | 1.7 |
| Brandy temperature (°C.) | 30 |
| Brandy flow rate (mL/min) | 680 |
| Sweep air temperature (°C.) | 30 |
| Sweep air flow rate (L/min) | 30 |
| Relative humidity of sweep air stream (%) | 84 ± 2 |
| Ethanol flux ($10^{-3}$ mL/cm$^2$—hr) | 62 |
| Water flux ($10^{-3}$ mL/cm$^2$—hr) | 0.84 |
| Retention of C$_5$ alcohols | 93 |
| Ethanol concentration in condensed permeate (%) | 42.2 |

Water activity balance was essentially perfect in this example. Water flux was only 1.4% of the ethanol flux, indicating that the membrane process is almost perfectly selective with respect to ethanol/water selection. The organoleptic quality of the low-alcohol brandy was very close to that of the original. Also, 93% of the two amyl-alcohols was retained. These results indicated that the membrane exhibited a very high ethanol/congener selectivity.

As will be apparent to those skilled in the art, many modifications and variations of this invention may be made without departing from its spirit and scope. The specific embodiments described herein are offered by way of example only, and the invention is limited only by the terms of the appended claims.

What is claimed:

1. A method for producing from a first alcoholic beverage a second beverage of reduced alcoholic content comprising the steps:
    providing a membrane which is alcohol permeable;
    feeding a first alcoholic beverage across a feed side of said membrane;
    feeding a gas-phase extraction fluid across a permeate side of said membrane, said extraction fluid being alcohol absorbing and comprising water vapor in an amount sufficient to minimize the diffusion of water from said first alcoholic beverage to said permeate side of said membrane by balancing the activity of water on said feed side of said membrane and said permeate side of said membrane; under conditions of temperature and pressure which are sufficient to evaporate into said gas-phase extraction fluid the portion of the alcohol initially present in said first alcoholic beverage which has crossed to the permeate side of said membrane, thereby forming from said first alcoholic beverage a second beverage having reduced alcoholic content;
    withdrawing said gas-phase extraction fluid containing water vapor and alcohol from said permeate side of said membrane, whereby said second beverage having reduced alcoholic content is produced on said feed side of said membrane.

2. The method of claim 1 in which the membrane is made of one selected from the group consisting of aliphatic polyamide, aliphatic polyurea, polyetheraminotriazine, aromatic polyamide, aromatic polyurea, regenerated cellulose, cellulose acetate, cellulose triacetate, crosslinked polyvinyl alcohol, polyacrylonitrile, polyacrylonitrile-copolymer, polybenzimidazole, polybenzimidazolone, hydrophilic crosslinked vinyl polymers or copolymers, and ion-exchange membranes with various counterions.

3. The method of claim 1 in which the membrane is permselective against at least a component of the first alcoholic beverage.

4. The method of claim 1 in which the gas-phase extraction fluid fed across the permeate side of the membrane comprises a non-condensable gas and water vapor.

5. The method of claim 1 in which the gas-phase extraction fluid fed across the permeate side of the membrane comprises a non-condensable gas, water vapor, and at least one organic component.

6. The method of claim 5 in which the organic component is added to the gas-phase extraction fluid.

7. The method of claim 4 or 5 in which the non-condensable gas is selected from the group comprising air and nitrogen.

8. The method of claim 4 or 5 in which the non-condensable gas is saturated with water, and then heated to adjust its relative humidity.

9. The method of claim 4 or 5 in which the addition of water vapor to the non-condensable gas is controlled by a single means to achieve the desired temperature, relative humidity, and flow rate.

10. The method of claim 1 in which the gas-phase extraction fluid fed across the permeate side of the membrane comprises water vapor at a pressure less than its saturation pressure.

11. The method of claim 1 in which the gas-phase extraction fluid fed across the permeate side of the membrane comprises a water vapor and an organic component each at a partial pressure less than its saturation pressure.

12. The method of claim 11 in which the organic component is added to the gas-phase extraction fluid.

13. The method of claim 10 or 11 in which the gas-phase extraction fluid fed across the permeate side of the membrane is under lower atmospheric pressure than said first alcoholic beverage.

14. The method of claim 13 in which the gas-phase extraction fluid fed across the permeate side of the membrane is maintained at a lower pressure than said first alcoholic beverage by applying a vacuum from a vacuum pump.

15. The method of claim 1 further comprising regulating the relative humidity of water vapor fed into the permeate side of the membrane.

16. The method of claim 1 in which the relative humidity of the water vapor is from about 60 to about 100 percent at about 4° C. to about 75° C.

17. The method of claim 1 in which the gas-phase extraction fluid containing water vapor and alcohol is recovered in liquid form by condensation.

18. The method of claim 1 in which the gas-phase extraction fluid containing water vapor and alcohol from said first beverage is recovered in liquid form by a gas-liquid contactor.

19. The method of claim 1 in which the membrane is in a hollow fiber form, and in which the first beverage is fed through the lumen of the membrane and the gas-phase extraction fluid is fed to the shell side of the membrane fiber.

20. The method of claim 1 in which the membrane is in a hollow fiber form, and in which the first beverage is fed to the shell side of the membrane and the gas-phase extraction fluid is fed through the lumen of the membrane.

21. The method of claim 1 in which the first beverage is beer.

22. The method of claim 21 in which the water vapor in the gas-phase extraction fluid is maintained at a relative humidity of about 95% to about 100% at about 4° C. to about 75° C.

23. The method of claim 1 in which the first beverage is a wine.

24. The method of claim 23 in which the wine has an ethanol content of from about 9 to about 15 volume percent and the ethanol content of the second beverage is from about 0.5 to about 12.0 volume percent.

25. The method of claim 23 or 24 in which the water vapor in the gas-phase extraction fluid is maintained at a relative humidity of about 85% to about 100% at about 4° C. to about 75° C.

26. The method of claim 1 in which the first beverage is a brandy.

27. The method of claim 26 in which the water vapor in the gas-phase extraction fluid is maintained at a relative humidity of about 80% to about 90% at about 20° C. to about 75° C.

28. The method of claim 1 in which the first beverage is a distilled spirit.

29. The method of claim 28 in which the water vapor in the gas-phase extraction fluid is maintained at a relative humidity of about 75% to about 85% at about 20° C. to about 75° C.

30. The method of claim 1 further comprising varying the ratio of beverage flow rate to membrane area so as to vary the degree of alcohol removal from the first beverage.

31. The method of claim 1 further comprising varying the temperature so as to regulate the rate of alcohol removal from the first beverage.

32. The method of claim 31 in which the temperature ranges from about 4° C. to about 75° C.

33. The method of claim 1 further comprising varying the flow rate of the beverage stream across the membrane relative to the flow rate of the gas-phase extraction fluid so as to regulate the rate and degree of alcohol removal from the first beverage.

* * * * *